United States Patent
Drechsel et al.

(10) Patent No.: US 12,038,181 B2
(45) Date of Patent: Jul. 16, 2024

(54) APPARATUS AND METHOD FOR HEAT RECOVERY FROM A LIQUID MEDIUM

(71) Applicant: REVINCUS GMBH, Jena (DE)

(72) Inventors: Felix Konstantin Drechsel, Weimar (DE); Jeremias Polster, Weimar (DE)

(73) Assignee: REVINCUS GMBH, Jena (DE)

( * ) Notice: Subject to any disclaimer, the term of this patent is extended or adjusted under 35 U.S.C. 154(b) by 419 days.

(21) Appl. No.: 17/422,741

(22) PCT Filed: Jan. 13, 2020

(86) PCT No.: PCT/EP2020/050685
§ 371 (c)(1),
(2) Date: Jul. 13, 2021

(87) PCT Pub. No.: WO2020/148230
PCT Pub. Date: Jul. 23, 2020

(65) Prior Publication Data
US 2022/0128244 A1     Apr. 28, 2022

(30) Foreign Application Priority Data

Jan. 14, 2019  (DE) .................... 10 2019 200 324.9

(51) Int. Cl.
| | | |
|---|---|---|
| F24D 17/00 | (2022.01) | |
| F28D 1/02 | (2006.01) | |
| F28D 21/00 | (2006.01) | |

(52) U.S. Cl.
CPC ....... *F24D 17/0005* (2013.01); *F28D 1/0213* (2013.01); *F28D 21/0012* (2013.01); *F24D 2200/20* (2013.01)

(58) Field of Classification Search
CPC ............. F24D 17/0005; F24D 2200/20; F28D 1/0213; F28D 21/0012; Y02B 30/18; Y02B 30/56; F28F 27/00
See application file for complete search history.

(56) References Cited

U.S. PATENT DOCUMENTS

| | | | |
|---|---|---|---|
| 2004/0217654 A1* | 11/2004 | Maturana | G06Q 10/06 |
| | | | 307/116 |
| 2016/0069617 A1 | 3/2016 | Gil et al. | |

FOREIGN PATENT DOCUMENTS

| | | | | |
|---|---|---|---|---|
| CN | 1041892 | A |   | 5/1990 |
| CN | 101655283 | A |   | 2/2010 |
| CN | 101749861 | A |   | 6/2010 |
| DE | 3742910 | A | * | 10/1988 ............ F24D 11/003 |

(Continued)

OTHER PUBLICATIONS

China Office Action, dated Jul. 25, 2022 for corresponding China Application No. 202080009104.2 with English translation (21 pages).

(Continued)

*Primary Examiner* — Ana M Vazquez
(74) *Attorney, Agent, or Firm* — Intellectual Property Law Group LLP (57) ABSTRACT

An apparatus and method for recovering heat from a liquid medium, including a heat exchanger having heat exchanger cells, which are thermally separate from each other, for receiving the liquid medium, each of the cells has a sensor for determining temperature of the liquid medium located therein; a pipeline for conducting drinking water and/or heating water, which pipeline extends through at least one of the cells; a supply line wherein the liquid medium is conducted; controllable flaps through which the liquid medium can be selectively fed from the supply line to the cells; a sensor for measuring temperature of the liquid medium in the supply line, the flaps are controlled in an open-loop and/or closed-loop manner such that the liquid medium is supplied from the supply line to the heat exchanger cell that has a current temperature which is the least colder than the gray water in the supply line.

17 Claims, 7 Drawing Sheets

(56) References Cited

FOREIGN PATENT DOCUMENTS

| | | | |
|---|---|---|---|
| DE | 3742910 A1 | 10/1988 | |
| DE | 9002016 U1 | 4/1990 | |
| DE | 19710803 A1 | 9/1998 | |
| DE | 102012211921 A1 | 1/2014 | |
| EP | 0174544 A1 | 3/1986 | |
| FR | 2405443 A1 | 5/1979 | |
| FR | 2405443 A * | 6/1979 | ............ F24D 11/003 |
| JP | 1-267306 A | 10/1989 | |
| JP | 2007-35483 A | 2/2007 | |
| JP | 2016-166717 A | 9/2016 | |

OTHER PUBLICATIONS

International Search Report, dated Apr. 2, 2020 for corresponding International Application No. PCT/EP2020/050685 with English translation (5 pages).

Written Opinion of the ISA, dated Apr. 2, 2020 for corresponding International Application No. PCT/EP2020/050685 (5 pages).

German Office Action, dated Sep. 27, 2019, for corresponding German application No. 10 2019 200 324.9 with English translation (10 pages).

Written Opinion of the ISA, dated Apr. 2, 2020 for corresponding International Application No. PCT/EP2020/050685 with English translation (5 pages).

Japanese Office Action, dated of Sep. 14, 2022 for corresponding Japanese Patent Application No. 2021-540818 with English translation (10 pages).

China Office Action, dated Mar. 8, 2023 for corresponding China Patent Application No. 202080009104.2 with English translation (20 pages).

Huang Shanbo et al., Heat Transfer Theory, China University of Petroleum Press, Apr. 2014, pp. 193-194, with English translation (total 8 pages).

* cited by examiner

APPARATUS AND METHOD FOR HEAT RECOVERY FROM A LIQUID MEDIUM

CROSS-REFERENCE TO RELATED APPLICATIONS

This application is a U.S. National Phase application, under 35 U.S.C. § 371, of International Application no. PCT/P2020/050685 with an international filing date of Jan. 13, 2020, and claims benefit of German Application no. 10 2019 200 324.9 filed on Jan. 14, 2019, each of which is hereby incorporated by reference for all purposes.

FIELD OF INVENTION

The present disclosure relates to a device and a method for heat recovery from a liquid medium.

BACKGROUND

Large amounts of polluted wastewater with a more or less high temperature level occur in buildings and industrial plants. The heat contained therein usually remains unused in the building.

From EP 0 174 554 B1 a heat exchanger for transferring heat from polluted wastewater is known, with a container serving to receive the wastewater which has an inlet leading through a filter, an outlet and preferably an optionally openable sludge outlet, and a number of exchange elements arranged in the container through which a heat transfer medium, in particular utility water or a heat transfer medium of a heat pump or refrigeration system, can flow, wherein the exchange elements are upright exchanger plates and in the lower region of the container an injection device is provided, designed and arranged to apply a flushing gas, preferably air, to the plate surfaces.

SUMMARY

The object of the present disclosure is to provide an improved device and an improved method for recovering heat from a liquid medium.

According to an aspect of the present disclosure, a device for recovering heat from a liquid medium, e.g. gray water, comprises:
  a heat exchanger having at least two at least partially thermally separate heat exchanger cells for accommodating the liquid medium, wherein each of the heat exchanger cells comprises a temperature sensor for determining a temperature of the liquid medium situated therein,
  at least one pipeline for carrying drinking water and/or heating water, the at least one pipeline passing through at least one of the heat exchanger cells,
  a supply line, in which the liquid medium is carried,
  a distributor device, by means of which the liquid medium can be selectively supplied to the heat exchanger cells from the supply line,
  at least one temperature sensor for measuring a temperature of the liquid medium in the supply line,
  wherein the distributor device is controllable in an open loop and/or closed loop manner such that the liquid medium from the supply line is supplied to the heat exchanger cell whose current temperature is the least colder than that of the liquid medium in the supply line.

In an embodiment, each of the heat exchanger cells is connected to an adjacent one or each adjacent one of the heat exchanger cells via cell connectors and/or via a structure restraining the flow of the liquid medium in order to supply the liquid medium to one of the adjacent heat exchanger cells.

Each of the heat exchanger cells may have a float for determining a liquid level, for example in order to open the further controllable flap to one of the adjacent heat exchanger cells or to a waste water system when the liquid medium is fed into one of the heat exchanger cells.

In an embodiment, the heat exchanger cells are arranged one upon the other, in particular such that the temperature of the liquid medium in the heat exchanger decreases from top to bottom. This stratification may occur through gravity.

In particular, no delivery device, for example a pump, is required for the liquid medium.

In an embodiment, the pipeline is formed as a tube spiral at least within the heat exchanger cells passed. A plurality of pipelines, in particular in the form of respective tube spirals, may be provided, for example two, three or more tube spirals.

In an embodiment, downstream of the heat exchanger, the pipeline comprises a closure valve, electronically controllable in an open loop and/or closed loop manner, by means of which a flow velocity is controllable. For example, the pipeline can also be closed and the flow stopped in this way.

In an embodiment, upstream of the closure valve, in particular downstream of the heat exchanger, in the pipeline a pressure gauge is provided by means of which a pressure drop is detectable. A pressure drop when the closure valve is closed indicates a leak in the pipeline.

In an embodiment, a bypass for the liquid medium is provided, wherein the liquid medium is conductible into a sewage system through the bypass bypassing the heat exchanger, if the temperature of the liquid medium in the supply line is lower than each of the currently existing temperatures of the liquid medium in the heat exchanger cells.

In an embodiment, a coarse filter is provided for filtering the liquid medium before it enters the heat exchanger. That way, contaminants may be removed from the liquid medium, for example gray water. The coarse filter may be arranged after a branch leading to the heat exchanger, so that the liquid medium flowing through the bypass does not flow through the coarse filter.

In one embodiment, a control part is provided for controlling the flaps in an open loop and/or closed loop manner and for detecting the temperatures from the temperature sensors. The control part may also control the liquid level in the heat exchanger cells via the respective float. If the liquid level in one of the heat exchanger cells rises despite the flaps being closed, it can be concluded that there is a leak in the pipeline.

In an embodiment, the pipelines are formed from portions which, after passing through one of the heat exchanger cells, begin and/or end on the top side thereof and are connected to a removable lid of the respective heat exchanger cell In an embodiment, the ends of the sections of the pipelines and the cell connectors have threads.

In an embodiment, the heat exchanger and/or the tube spirals are/is formed from a plastic material or comprise/comprises plastic surfaces for contact with the liquid medium. The heat exchanger and/or the pipeline may also comprise metal, for example stainless steel. In particular the pipeline may be formed for example from metal, in particular stainless steel, and coated with plastic on an outside and/or an inside.

In an embodiment, the distributor device comprises a number of controllable flaps. In a further embodiment, the distributor device comprises:

an outer tube, at which branches to the individual heat exchanger cells are provided, an inner tube arranged within the outer tube and rotatable by means of a drive, wherein an outer diameter of the inner tube at least approximately corresponds to an inner diameter of the outer tube, wherein the inner tube comprises a respective aperture to each branch at the same level in the longitudinal direction, which, by rotating the inner tube, can be set to an angular position in which it aligns with the respective branch, such that in each rotational position of the inner tube at most one of the apertures is aligned with the associated branch.

In an embodiment, the cell connector respectively comprises a further controllable flap and/or a siphon, collecting the liquid medium at an outlet, in particular, at a bottom of the respective upper one of the interconnected heat exchanger cells, then conducts the liquid medium at least up to the height of an upper edge of the respective upper one of the interconnected heat exchanger cells and finally into the respective lower one of the interconnected heat exchanger cells.

In an embodiment, a vent valve is provided at a high point of the syphon.

In an embodiment, the siphon is run up to the height of a top edge of the top one of the heat exchanger cells.

In an embodiment, a further pipeline is provided as the return of a heating system, passing through the heat exchanger cells from the bottom upward, wherein between the heat exchanger cells and above the top heat exchanger cell, the pipeline is respectively connected via connection tube to a feed line, wherein controllable flaps are provided in the connection tubes by means of which a predetermined supply temperature is adjustable in the feed line.

In a method according to an aspect of the present disclosure for operating the device, the flaps are controlled in an open loop and/or closed loop manner such that the liquid medium from the supply line is supplied to the heat exchanger cell whose current temperature is the least colder than that of the gray-water in the supply line.

In an embodiment, each of the heat exchanger cells is connected to an adjacent one or each adjacent one of the heat exchanger cells via cell connectors with in each case a further controllable flap in order to supply the liquid medium to one of the adjacent heat exchanger cells, wherein, if a heat exchanger cell to be filled is already filled with liquid medium, the further flap thereof in the cell connector is initially opened to provide the necessary space and to conduct the existing liquid medium into the subjacent heat exchanger cell or into a sewage system.

In an embodiment, gray water is used as the liquid medium.

In an embodiment, the drinking water and/or heating water is conducted through the pipeline from the bottom upward through the heat exchanger.

BRIEF DESCRIPTION OF THE DRAWINGS

Embodiments of the present disclosure are described below with reference to drawings in more detail.

Corresponding parts are identified by the same reference numerals in all figures.

DETAILED DESCRIPTION OF SPECIFIC EMBODIMENTS

Figure 1:
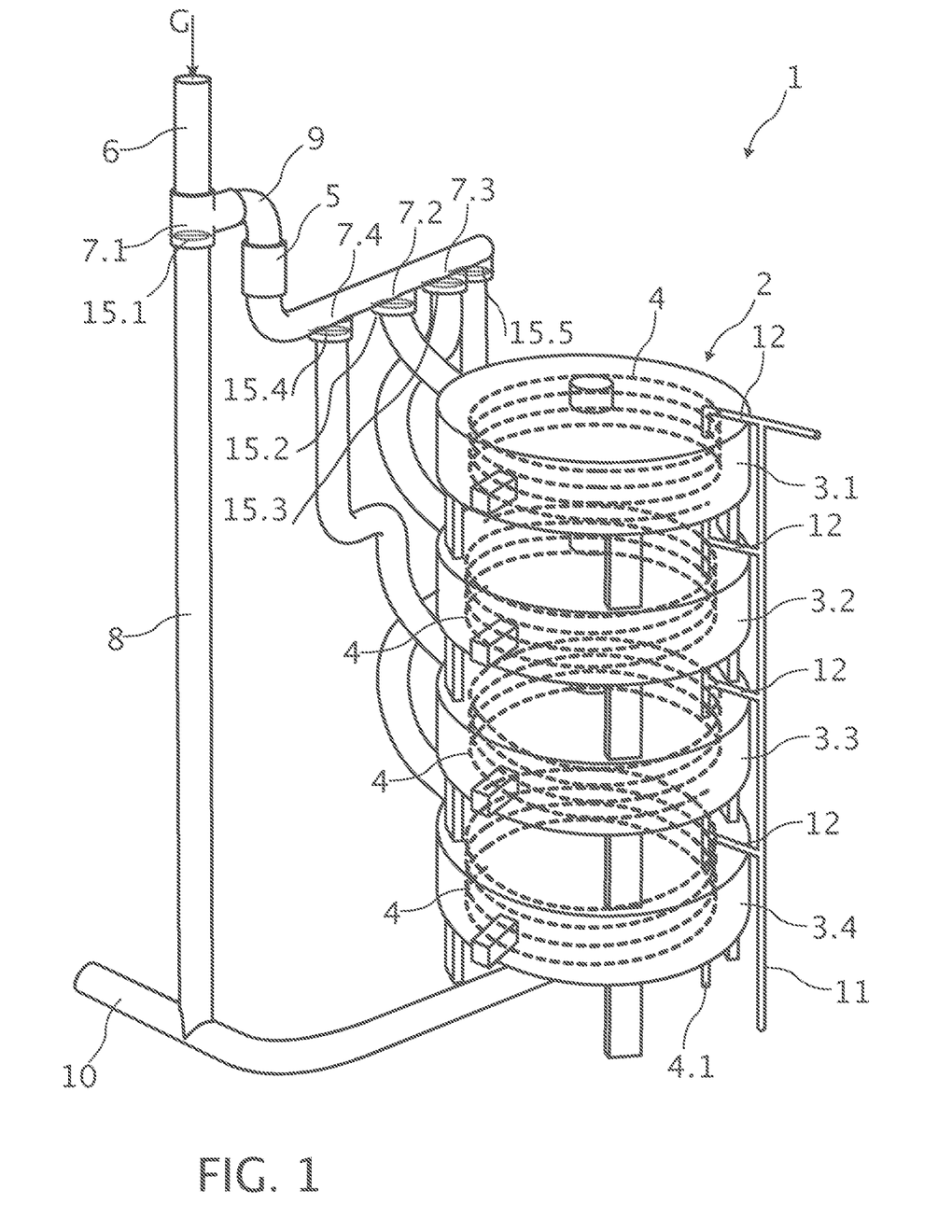
FIG. 1 is a schematic view of an exemplary embodiment of a device for heat recovery from gray water.
Figure 2:
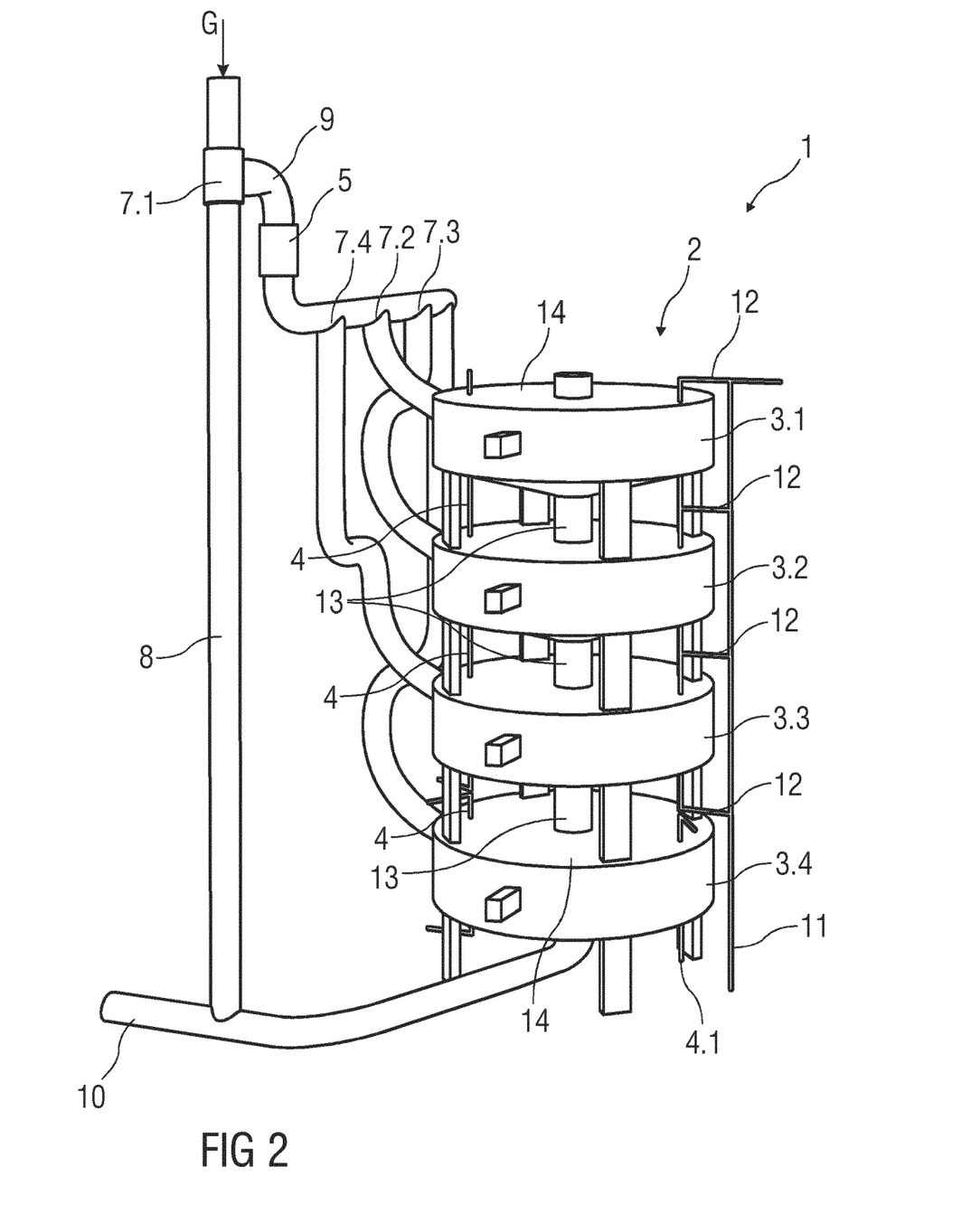
FIG. 2 is a further schematic view of the device for heat recovery from gray water.

FIGS. 1 and 2 show schematic views of an exemplary embodiment of a device 1 for heat recovery from gray water.

The device 1 is suitable for heating drinking water and optionally a hot water heating system, in particular a low temperature heating system, through the use of gray water in a heat exchanger 2. The heat exchanger 2 comprises several heat zones that are thermally separated from one another, i.e. several heat exchanger cells 3.1, 3.2, 3.3, 3.4 connected to one another in the form of tanks. In the present embodiment there are four heat exchanger cells 3.1, 3.2, 3.3, 3.4 provided. The heat exchanger cells 3.1, 3.2, 3.3, 3.4 are traversed by at least one pipeline 4, in particular a tube spiral 4, for example at least two tube spirals 4, 4.1 or a double spiral. The pipeline 4 carries drinking water or heating water of a hot water heating system or low temperature heating system. In the case of two tube spirals 4, 4.1, one of the tube spirals 4 carries drinking water and the other one carries heating water. The tube spirals 4, 4.1 run through one or more of the heat exchanger cells 3.1, 3.2, 3.3, 3.4, for example also all heat exchanger cells 3.1, 3.2, 3.3, 3.4. The device 1 is connected to a gray water supply line 6, which carries gray water G that occurs in a building or a system. A first branch 7.1 comprises a temperature sensor for determining a temperature of the gray water and a controllable flap 15.1 by which the gray water is either fed to a gray water collector 9 of the device 1 if a predetermined first temperature is exceeded or reached, or through a bypass 8 bypassing the device 1 if the temperature falls below the predetermined first temperature.

In the gray water collector 9, the gray water G first passes a coarse filter 5 in which it is cleaned. Downstream of the coarse filter 5, the gray water collector has a number of branches 7.2 to 7.4, for example a second branch 7.2, a third branch 7.3 and a fourth branch 7.4. The second branch 7.2 comprises a temperature sensor for determining a temperature of the gray water G and a controllable flap 15.2 by which the gray water G is fed, in particular exclusively fed, to the heat exchanger cell 3.1 if a predetermined second temperature is exceeded or reached. In an embodiment, if the temperature falls below the predetermined second temperature, no gray water G is supplied to the heat exchanger cell 3.1. The third branch 7.3 includes a temperature sensor for determination of a temperature of the gray water G and a controllable flap 15.3 by which the gray water G is fed, in particular exclusively fed, to the heat exchanger cell 3.2 if a predetermined third temperature is exceeded or reached. In an embodiment, if the temperature falls below the predetermined third temperature, no gray water G is supplied to the heat exchanger cell 3.2. The fourth branch 7.4 includes a temperature sensor for determination of a temperature of the gray water G and a controllable flap 15.4 by which the gray water G is fed, in particular exclusively fed, to the heat exchanger cell 3.3 if a predetermined fourth temperature is exceeded or reached. In an embodiment, if the temperature falls below the predetermined fourth temperature, no gray water G is supplied to the heat exchanger cell 3.3. If the flaps 15.2, 15.3, 15.4 of the second to fourth branches 7.2, 7.3, 7.4 are closed, the gray water G may be fed to the heat exchanger cell 3.4. In the supply line to the heat exchanger cell 3.4, a further controllable flap 15.5 may be provided by which the gray water G is fed, in particular exclusively fed to the heat exchanger cell 3.3 if a predetermined fifth temperature is exceeded or reached, and which is otherwise closed. In particular, the flaps 15.2, 15.3, 15.4, 15.5 of the second to fourth branches 7.2, 7.3, 7.4 and in the feed line to the heat exchanger cell 3.4 may be controlled so that none or only one of the flaps 15.2, 15.3, 15.4, 15.5 is respectively open. In an embodiment, the second predetermined temperature is higher than the third predetermined temperature and this is higher than the fourth predetermined temperature. The heat exchanger cells 3.1 to 3.4 may in particular be arranged one above the other in such a way that the temperature of the gray water G in the heat exchanger 2 decreases from top to bottom by this relation.

Instead of a respective temperature sensor for each branch 7.2, 7.3, 7.4, only one temperature sensor may likewise be provided in the gray water collector 9, by means of which the flaps 15.2, 15.3, 15.4, 15.5 of the branches 7.2, 7.3, 7.4 and in the feed line to the heat exchanger cell 3.4 are controlled. Likewise, only one temperature sensor may be provided in the first branch 7.1 or upstream in front of it by means of which the flaps 15.2, 15.3, 15.4, 15.5 of the branches 7.1, 7.2, 7.3, 7.4 and in the feed line to the heat exchanger cell 3.4 are controlled. In an embodiment, the flaps 15.2, 15.3, 15.4, 15.5 are electronically controlled, for example by means of a control part (not shown). A control part may be designed so that the temperature of the gray water G occurring in the gray water collector 9 is compared with the temperatures in the heat exchanger cells 3.1 to 3.4 and the gray water G from the gray water collector 9 is fed to that heat exchanger cell 3.1 to 3.4 whose current temperature is the least colder than that of the gray water G in the gray water collector 9. For this purpose, each of the heat exchanger cells 3.1 to 3.4 may be equipped with a temperature sensor.

Each of the heat exchanger cells 3.1, 3.2, 3.3, 3.4 may be connected to one or each adjacent one of the heat exchanger cells 3.1, 3.2, 3.3, 3.4 via cell connectors 13, each with a further controllable flap. In particular, the coldest gray water G is stored in the lowest heat exchanger cell 3.4 and the hottest gray water G in the uppermost heat exchanger cell 3.1. Each of the heat exchanger cells 3.1, 3.2, 3.3, 3.4 may have a gradient in the direction of the cell connector 13 to the respective subjacent heat exchanger cell 3.1, 3.2, 3.3, 3.4 or to the sewage system 10.

Each of the heat exchanger cells 3.1, 3.2, 3.3, 3.4 may have a float for determining a liquid level, for example, to open the further controllable flap to one of the adjacent heat exchanger cells 3.1, 3.2, 3.3, 3.4 or to a waste water system 10 if the liquid medium G is fed into one of the heat exchanger cells 3.1, 3.2, 3.3, 3.4. The control part may also detect the liquid level in the heat exchanger cells 3.1, 3.2, 3.3, 3.4 via the respective floats. If the fluid level in one of the heat exchanger cells 3.1, 3.2, 3.3, 3.4 increases in spite of closed flaps 15.2, 15.3, 15.4, 15.5, it can be concluded that there is a leak in the pipeline 4, 4.1.

There may be several pipelines provided, in particular in the form of respective tube spirals 4, 4.1, for example two, three or more tube spirals. The drinking water and/or heating water is passed through the tube spiral 4, for example from bottom to top.

After passing through the entire heat exchanger 2 or a part thereof, a flow rate may be regulated and the flow may be stopped by an electronically controllable shut-off valve in the drinking water line and/or heating water line. The preheated drinking water may then be fed into a buffer store (not shown), which may be heated to a desired final temperature by one or more heating devices.

In an embodiment, a tube spiral 4.2 in the lowermost heat exchanger cell 3.4 may be used for a heat pump, which largely or completely removes the energy of the water and optionally heats the buffer store with it.

The object of the device 1 is to recover heat from occurring gray water G for heating drinking water and, if applicable, of heating water, especially for a low-temperature heating system, for example underfloor heating. The prerequisite for this is the exact separation of the wastewater into black water and gray water by a two-pipe sewer system. Gray water is understood as meaning wastewater without faeces, while black water may contain faeces. The temperature of the accumulating gray water G is measured by at least one temperature sensor and compared with the existing temperatures of the gray water G in the various heat exchanger cells 3.1 to 3.4 of the heat exchanger 2. If the temperature of the accumulating gray water G is lower than each of the currently existing temperatures of the gray water G in the various heat exchanger cells 3.1 to 3.4, the gray water is passed through the bypass 8 into a sewage system 10.

However, if the temperature of the gray water G is greater than or equal to the lowest temperature in one of the heat exchanger cells 3.1 to 3.4, the gray water G passes through the coarse filter 5 and is then passed through the flaps 15.2, 15.3, 15.4, 15.5 into one of the heat exchanger cells 3.1 to 3.4. Herein, the initially measured temperature of the gray water G to be fed in is used to decide about the heat exchanger cell 3.1 to 3.4 to which it is directed. If the heat exchanger cell in question 3.1 to 3.4 is already filled with gray water G, the further flap in the cell connector 13 may first be opened in order to create the necessary space and to transfer the existing gray water G into the heat exchanger cell 3.1 to 3.4 below or into the sewer system 10.

The tube spirals 4 are separated from the contents of the heat exchanger cells 3.1 to 3.4. Each of the heat exchanger cells 3.1 to 3.4 has a feed opening, for example a lateral feed opening through which the gray water G is fed. Through the cell connectors 13 with the further controllable flaps between the heat exchanger cells 3.1 to 3.4, for example in the center of the heat exchanger cells 3.1 to 3.4, the gray water G may be transferred electronically controlled from one of the heat exchanger cells 3.1 to 3.4 into a heat exchanger cell 3.1 to 3.4 below or into the sewage system 10.

Figure 3:
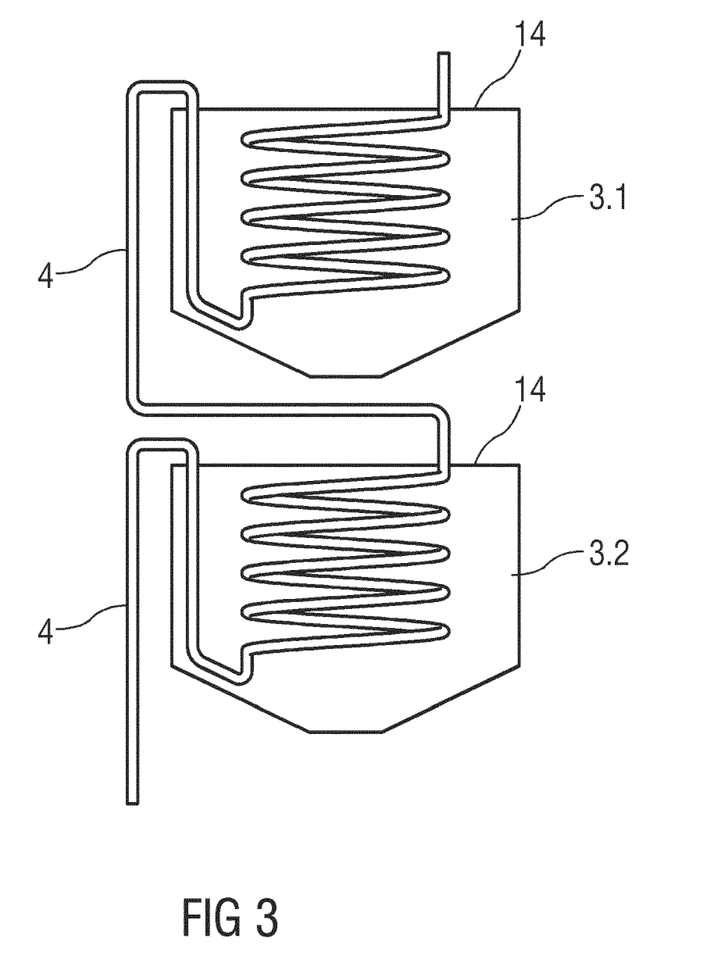
FIG. 3 is a schematic detail view of an embodiment of the device for heat recovery.

The spiral tubes 4, 4.1, 4.2, which pass through the heat exchanger cells 3.1 to 3.4, may begin and/or end on an upper side of the respective heat exchanger cell 3.1 to 3.4 and be connected to a respective removable cover 14. FIG. 3 shows a schematic detailed view of an embodiment of the device in which the tube spiral 4 begins and ends at the top of the respective heat exchanger cell 3.1, 3.2, for example in the cover 14. The heat exchanger cells 3.3, 3.4, not shown in FIG. 3, may also be designed in this way. This means that any deposits can be cleaned without any problems. The ends of the tube spiral 4 and the cell connectors 13 may have pipe ends with threads on each heat exchanger cell 3.1, 3.2, 3.3, 3.4, whereby the heat exchanger cells 3.1 to 3.4 may be connected to one another in a modular manner. The number of heat exchanger cells 3.1 to 3.4 to be connected may be adapted to the gray water G that occurs. Each of the heat exchanger cells 3.1 to 3.4 may have a temperature sensor with which the temperature of the gray water G stored in the respective heat exchanger cell 3.1 to 3.4 may be measured. The newly accumulating gray water G is passed through the flaps 15.2, 15.3, 15.4, 15.5, which may be controlled by a control part in an open loop and/or closed loop manner. The control part compares the temperatures of the accumulating gray water G with the temperatures of the gray water G in the heat exchanger cells 3.1 to 3.4. The gray water G is fed into the heat exchanger cell 3.1 to 3.4 that is the least colder than the gray water G. Should this heat exchanger cell 3.1 to 3.4 be too full, the further flap in the cell connector 13 of this heat exchanger cell 3.1 to 3.4 to the heat exchanger cell 3.1 to 3.4 below is opened until all of the gray water G has been fed in. This control of the further flap may also be carried out by the control part. The further flap of the lowest heat exchanger cell 3.4 directs the gray water G into the sewage system 10. The hottest gray water G is stored in the uppermost heat exchanger cell 3.1 and, with decreasing temperature, in the heat exchanger cells 3.2 to 3.4 below. The drinking water and/or the heating water may run through the tube spiral 4 in the heat exchanger cells 3.1 to 3.4 tanks from the lowest heat exchanger cell 3.4 to the uppermost heat exchanger cell 3.1. Herein, the pressure of the drinking water can be used. After passing through the gray water tank the drinking water pipe and/or the heating water pipe has an electronically controllable valve by which the flow rate may be regulated in order to enable the maximum heat absorption or to be able to set a desired flow temperature in the heating circuit. A pressure gauge may also be located in front of this valve. If the pressure in the drinking water line and/or in the heating water line drops although the valve is closed, it can be concluded that there is a leak in the relevant tube spiral 4. In this way, a protective function is implemented in order to immediately notice the entry of gray water into the drinking water pipe and/or into the heating circuit. The preheated drinking water may be fed into an existing buffer tank and heated to the desired final temperature therein by one or more technical systems.

The joined heat exchanger cells 3.1, 3.2, 3.3, 3.4 may be isolated by insulating materials.

An installation location of the device 1 is preferably selected in a building or outside such that the gray water G can flow through the device 1 due to a gradient unhindered so that pumps may be dispensed with.

Outside a building, the heat exchanger 2 may be arranged in a thermally insulated manner in an underground tank. In this way, the device 1 is also suitable for buildings without a basement or with little space.

The heat exchanger 2 and/or the tube spirals 4 may be made of plastic. In this way, the device 1 is better suited for aggressive liquids in the gray water G. The heat exchanger 2 and/or the pipeline 4 may also comprise metal, for example stainless steel. In particular, the pipeline 4 may be formed for example from metal, in particular stainless steel, and coated with plastic on an outside and/or an inside.

The device 1 may be used without significant changes for the use of waste heat from cooling systems. Herein, the waste heat from the cooling system is absorbed by means of a cooling liquid, for example water, and fed into the heat exchanger 2 instead of the gray water G. In this case, the temperatures may be over 40° C. on average and can therefore also be used for domestic hot water heating and heating systems, in particular low-temperature heating systems. Herein, the water that absorbs and gives off the waste heat is kept in a cycle and is not contaminated, so that maintenance effort as a result of pollution and the connection to the sewage network can be dispensed with.

The device 1 allows for using a large proportion of the energy in the gray water or cooling water. This enables a considerable reduction in energy costs.

The device 1 may be combined with various heating systems. In combination with a heat pump system with earth drilling, for example, cost savings of around 85% are possible.

The device 1 causes only low operating costs, since hardly any electricity is needed for operation because there are no pumps.

The device 1 is a regenerative system and is therefore a renewable system and meets modern requirements of the Energy Saving Ordinance. This enables cost savings in the envelope of buildings. For example, less insulation and no triple glazing may be required because the device 1 saves so much energy that these measures are no longer absolutely necessary.

Thanks to the energy recovery, the device can pay for itself in a reasonable amount of time.

The method described represents a new type of cooling, i.e. the removal of waste heat from cooling systems and simultaneous use of the energy stored therein.

In one embodiment, instead of the gray water G, another heated liquid, for example cooling liquid from a cooling system, a power plant or an industrial system, may be used.

In an embodiment, a tube spiral 4 for drinking water may be run through all heat exchanger cells 3.1, 3.2, 3.3, 3.4 from bottom to top. In the lowermost heat exchanger cell 3.4, a tube spiral 4 may be provided for generating heat for a heat pump. In the heat exchanger cells 3.1, 3.2, 3.3 above, a tube spiral 4 for generating heat for a heating system, in particular a low-temperature heating system, for example underfloor heating or for raising the return temperature, may be provided.

For the low-temperature heating system, a further pipeline 4.1 may be provided, which runs through the heat exchanger cells 3.1, 3.2, 3.3, 3.4 from bottom to top as a return. Between the heat exchanger cells 3.1, 3.2, 3.3, 3.4 and above the uppermost heat exchanger cell 3.1, the pipeline 4.1 is connected to a feed line 11 via respective connecting pipes 12. Electronically controlled flaps may be provided in the connecting pipes 12, by means of which a predetermined flow temperature can be set in the flow line 11. The flaps in the connecting pipes 12 may also be controlled by the control part in an open loop and/or closed loop manner.

In an exemplary embodiment, the predetermined temperature for the uppermost heat exchanger cell 3.1 may be 40° C., for the heat exchanger cell 3.2 below 35° C., for the heat exchanger cell 3.3 below 30° C. and for the lowest heat exchanger cell 3.4 20° C.

Figure 4:
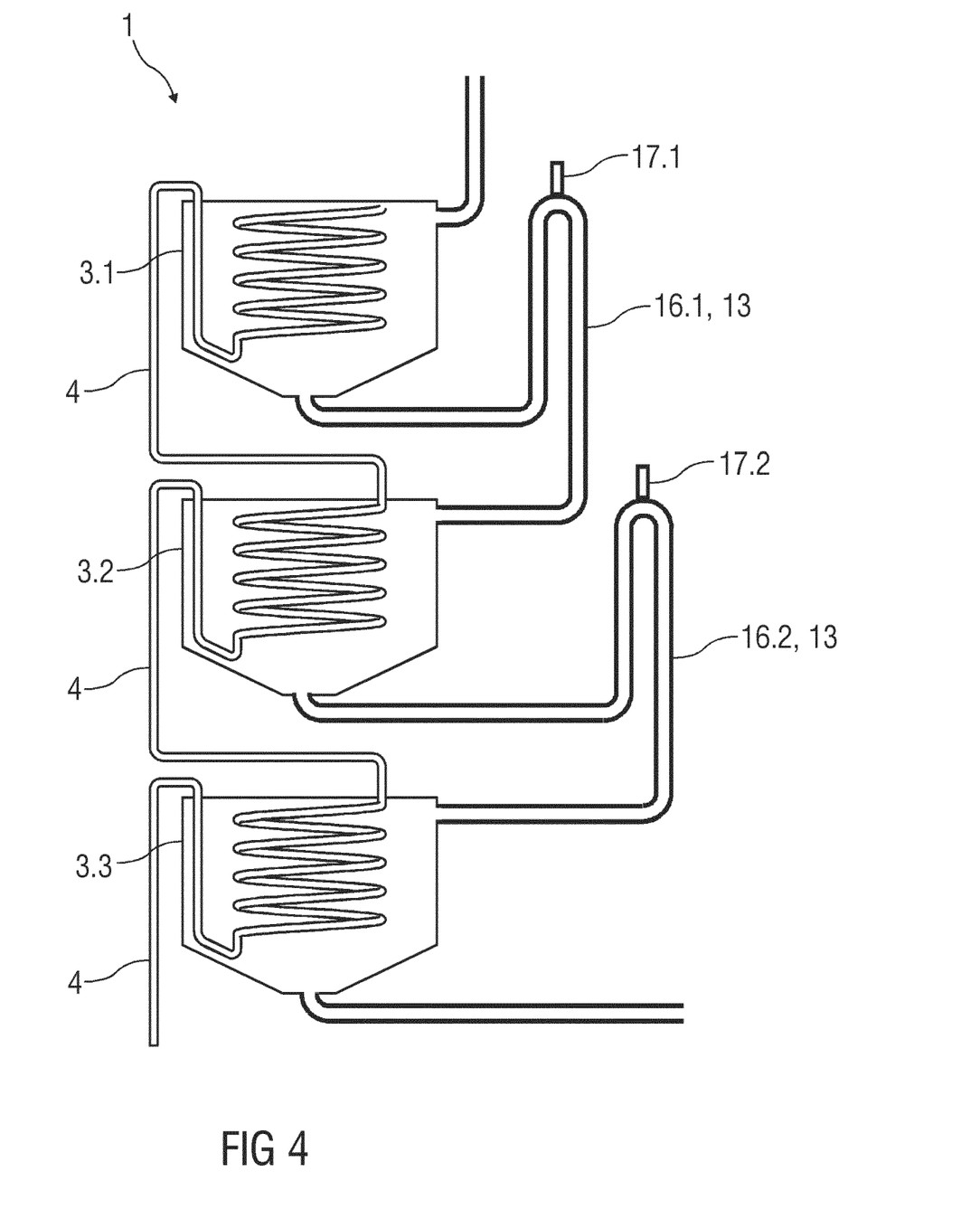
FIG. 4 is a schematic view of an exemplary embodiment of the device with heat exchanger cells, wherein cell connectors of adjacent heat exchanger cells comprise a respective syphon.

FIG. 4 shows an exemplary embodiment of the device 1 with heat exchanger cells 3.1, 3.2, 3.3, the cell connectors 13 of adjacent heat exchanger cells 3.1, 3.2, 3.3 having a respective siphon 16.1, 16.2 which takes the gray water G at an outlet, in particular at a base of the respective upper one of the interconnected heat exchanger cells 3.1, 3.2, 3.3, then up to the level of an upper edge of the respective upper one of the interconnected heat exchanger cells 3.1, 3.2, 3.3 and finally into the respective lower one of the interconnected heat exchanger cells 3.1, 3.2, 3.3. At a high point of the syphon 16.1, 16.2 a vent valve 17.1, 17.2 may be provided.

Figure 5:
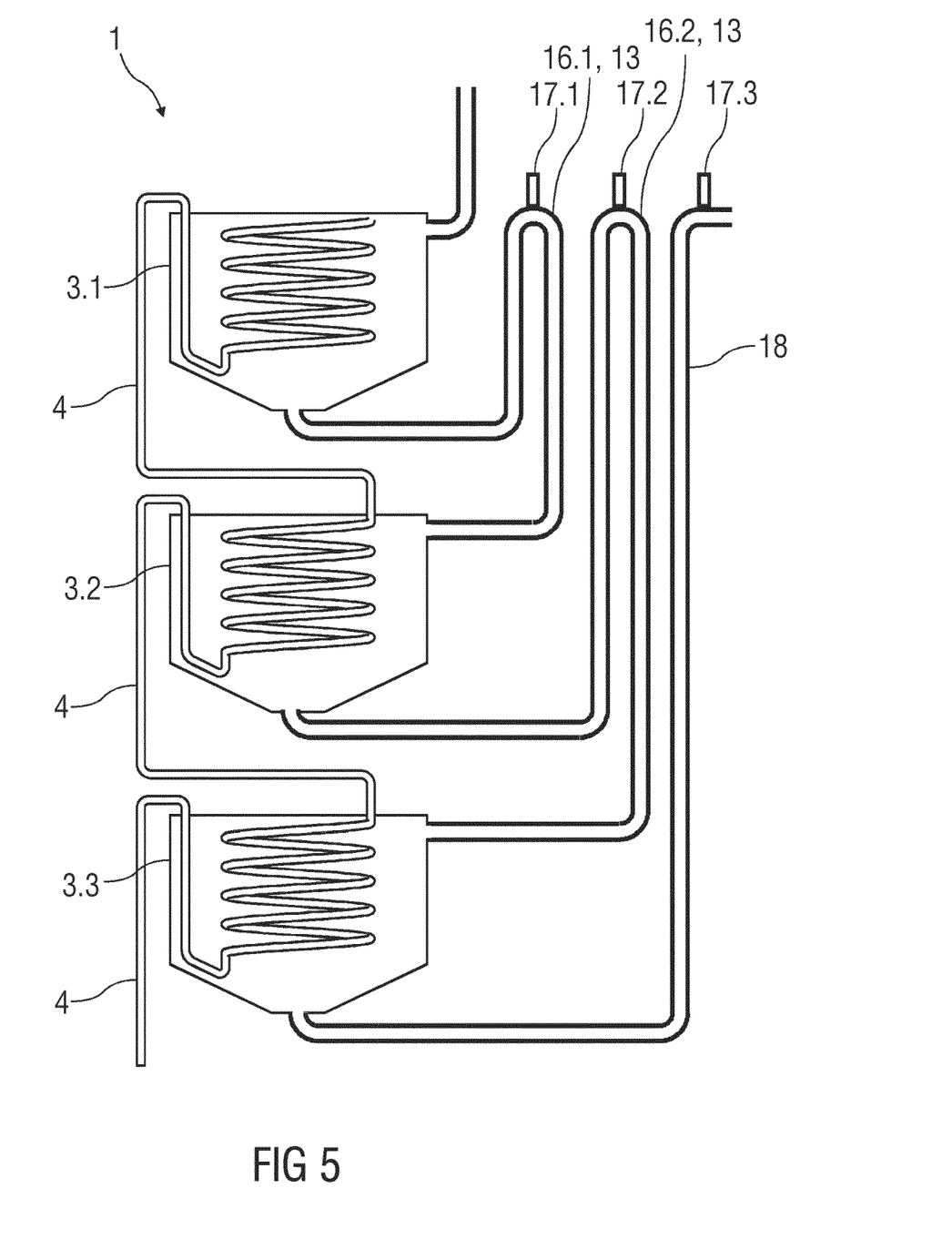
FIG. 5 is a schematic view of a further exemplary embodiment of the device with heat exchanger cells, wherein cell connectors of adjacent heat exchanger cells comprise a respective syphon.

FIG. 5 shows an exemplary embodiment of the device 1 with heat exchanger cells 3.1, 3.2, 3.3, wherein the cell connectors 13 of adjacent heat exchanger cells 3.1, 3.2, 3.3 comprise a respective syphon 16.1, 16.2 which takes the gray water G at an outlet, in particular at a base of the respective upper one of the interconnected heat exchanger cells 3.1, 3.2, 3.3, and is then respectively run up to the level of an upper edge of the uppermost one of the heat exchanger cells 3.1, 3.2, 3.3 and finally into the lower one of the interconnected heat exchanger cells 3.1, 3.2, 3.3. At a high point of the syphon 16.1, 16.2 a vent valve 17.1, 17.2 may be provided, respectively. Furthermore, a floor drain 18 of the lowermost heat exchanger cell 3.3 is also led up to the level of the upper edge of the uppermost of the heat exchanger cells 3.1, 3.2, 3.3 and a vent valve 17.3 may be provided at this high point.

Figure 6:
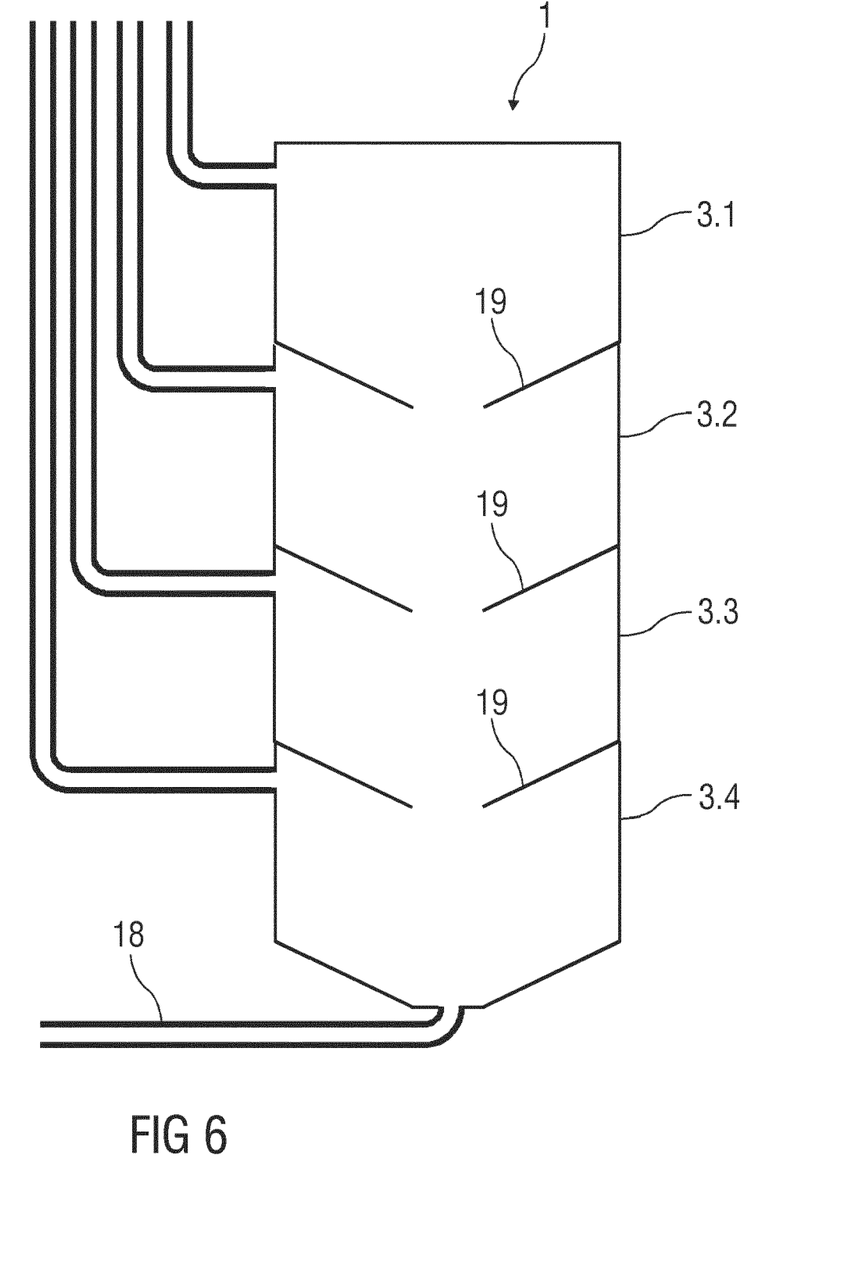
FIG. 6 is a schematic view of an exemplary embodiment of the device with heat exchanger cells which are arranged one above the other, with a structure restraining the flow of gray water being provided between adjacent heat exchanger cells.
Figure 7:
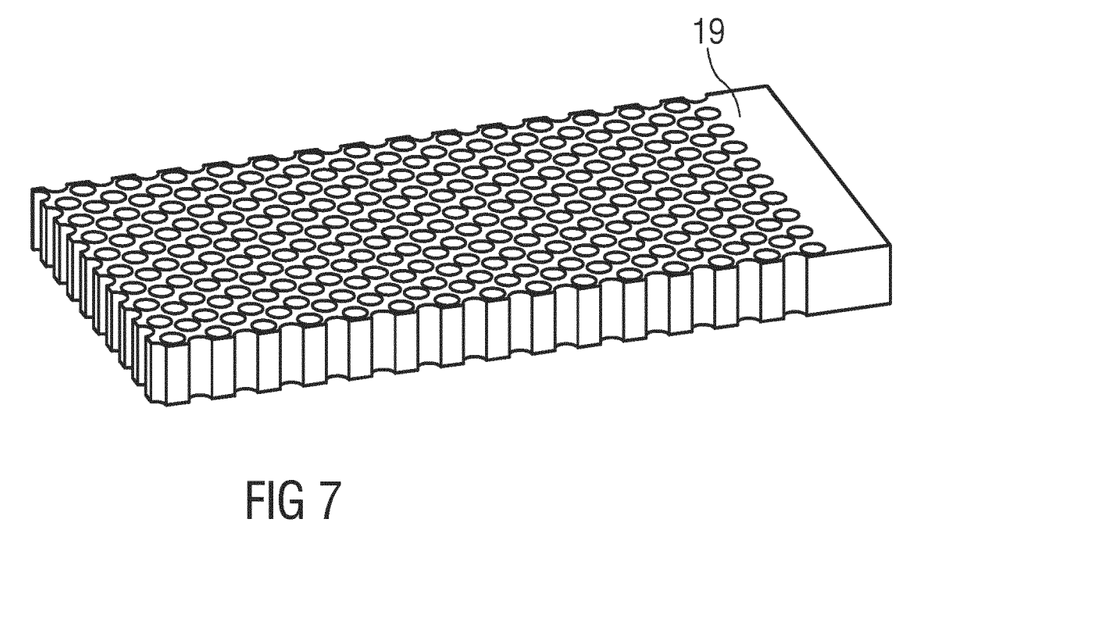
FIG. 7 is a schematic view of the restraining structure.

FIG. 6 shows an exemplary embodiment of the device 1 with heat exchanger cells 3.1, 3.2, 3.3, 3.4, which are arranged one above the other, with a structure 19 restraining the flow of gray water G being provided between adjacent heat exchanger cells 3.1, 3.2, 3.3, 3.4. The pipeline 4 is not shown. The restraining structure 19 may be designed, for example, as a perforated plastic plate, as is shown by way of example in FIG. 7. The heat exchanger cells 3.1, 3.2, 3.3, 3.4 may be designed as separate containers or as sections of a common container.

There may be more or less connected heat exchanger cells 3.1 to 3.4 be provided than shown in FIGS. 4 to 6.

In the embodiments of FIGS. 4, 5 and 6, cell connectors 13 with further controllable flaps may be dispensed with.

Figure 8:
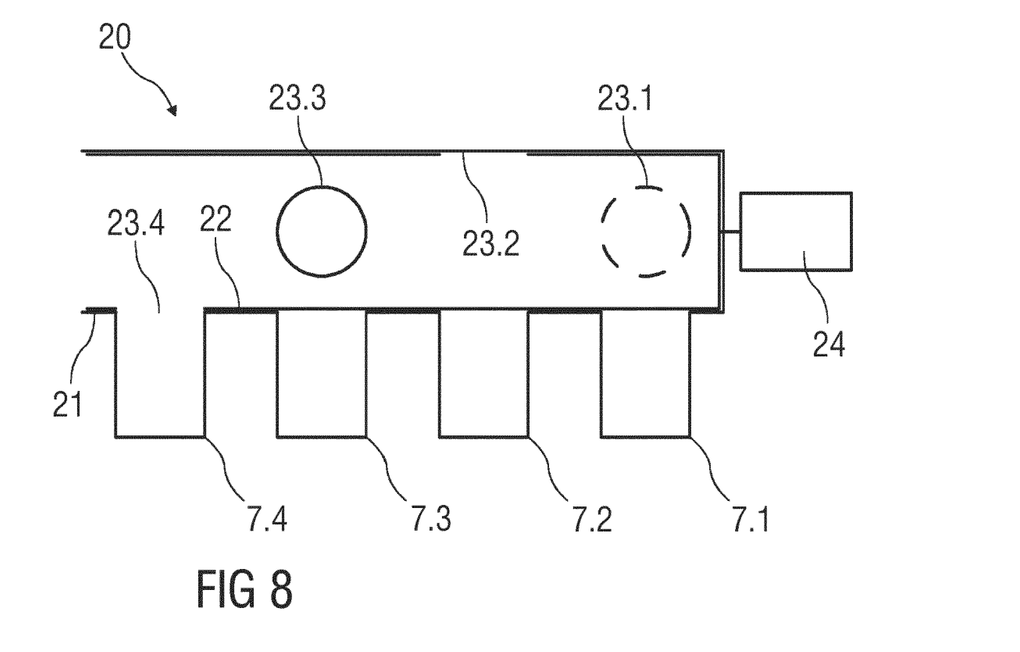
FIG. 8 shows an alternative distribution device for the gray water.

FIG. 8 shows an alternative distributor device 20 for the gray water G, comprising an outer pipe 21 which is closed at one end and on which the branches 7.1, 7.2, 7.3, 7.4 are provided, for example offset in the longitudinal direction of the outer pipe 21. An inner tube 22 is rotatably arranged in the outer tube 21, an outer diameter of the inner tube 22 approximately corresponding to an inner diameter of the outer tube 21, wherein the inner tube 22 comprises a respective aperture 23.1, 23.2, 23.3, 23.4 to each branch 7.1, 7.2, 7.3, 7.4 at the same level in the longitudinal direction, which, by rotating the inner tube 22, may be set to an angular position in which it aligns with the respective branch 7.1, 7.2, 7.3, 7.4, such that gray water G can flow from the inner tube 22 through the aperture 23.1, 23.2, 23.3, 23.4 into the respective branch 7.1, 7.2, 7.3, 7.4. In particular, the apertures 23.1, 23.2, 23.3, 23.4 are distributed in the circumferential direction in the inner tube 22 such that in each rotational position of the inner tube 22, at most one of the apertures 23.1, 23.2, 23.3, 23.4 is aligned with the associated branch 7.1, 7.2, 7.3, 7.4.

To rotate the inner tube 22, an electric servomotor 24 may be provided, which is controlled based on the temperature of the gray water G in the gray water collector 9 and in the individual heat exchanger cells 3.1, 3.2, 3.3, 3.4 to open the respective branch 7.1, 7.2, 7.3, 7.4.

In further embodiments, the gray water G may be guided in the pipeline 4, in particular in a tube spiral 4.1. This enables an inverse use, the pipeline 4 being connected to the branches 7.1, 7.2, 7.3, 7.4 and the medium to be heated being present in the container of the heat exchanger cell 3.1, 3.2, 3.3, 3.4. The pipeline 4 may be designed in such a way that it occupies an arbitrarily large proportion of the volume of the respective heat exchanger cell 3.1, 3.2, 3.3, 3.4, for example up to half the volume of the heat exchanger cell 3.1, 3.2, 3.3, 3.4 or beyond.

LIST OF REFERENCES

1 device
2 heat exchanger
3.1, 3.2, 3.3, 3.4 heat exchanger cell
4, 4.1, 4.2 pipeline, tube spiral
5 coarse filter
6 supply line, gray water supply line
7.1 first branch
7.2 second branch
7.3 third branch
7.4 fourth branch
8 bypass
9 gray water collector
10 sewage system
11 feed line
12 connection tube
13 cell connector
14 lid
15.1 to 15.5 flap
16.1 to 16.3 syphon
17.1 to 17.3 vent valve
18 floor drain
19 restraining structure
20 distributor device
21 outer tube
22 inner tube
23.1 to 23.4 aperture
24 servomotor
G gray-water, liquid medium

What is claimed is:

1. A device for recovering heat from a liquid medium, comprising:
   a heat exchanger having at least two at least partially thermally separate heat exchanger cells for accommodating the liquid medium, wherein each of the heat exchanger cells comprises a temperature sensor for determining a temperature of the liquid medium situated therein,
   at least one pipeline for carrying one of drinking water and heating water, the at least one pipeline passing through at least one of the heat exchanger cells,
   a supply line, in which the liquid medium is carried,
   a distributor device, by means of which the liquid medium can be selectively supplied to the heat exchanger cells from the supply line,
   at least one temperature sensor for measuring a temperature of the liquid medium in the supply line,
   wherein the distributor device is controllable in at least one of an open loop and a closed loop manner such that the liquid medium from the supply line is supplied to the heat exchanger cell whose current temperature is the least colder than that of the liquid medium in the supply line; and
      wherein a bypass for the liquid medium is provided, wherein the liquid medium is conductible into a sewage system through the bypass bypassing the heat exchanger, if the temperature of the liquid medium in the supply line is lower than each of the currently existing temperatures of the liquid medium in the heat exchanger cells.

2. The device as claimed in claim 1, wherein each of the heat exchanger cells is connected to at least one adjacent one of the heat exchanger cells via at least one of a cell connector and a structure restraining the flow of the liquid medium in each case in order to supply the liquid medium to the at least one adjacent one of the heat exchanger cells.

3. The device according to claim 1, wherein the heat exchanger cells are arranged one upon the other.

4. The device according to claim 1, wherein the pipeline is formed as a tube spiral at least within the heat exchanger cells passed.

5. The device according to claim 4, wherein at least one of the heat exchanger and the tube spiral are/is one of formed from a plastic material and comprising plastic surfaces for contact with the liquid medium.

6. The device according to claim 1, wherein downstream of the heat exchanger the pipeline comprises a closure valve, electronically controllable in at least one of an open loop and closed loop manner, by means of which a flow velocity is controllable.

7. The device as claimed in claim 6, wherein, upstream of the closure valve in the pipeline, a pressure gauge is provided, by means of which a pressure drop is detectable.

8. The device according to claim 1, wherein the at least one pipeline is formed from portions which, after passing through one of the heat exchanger cells, terminate at a top side of the heat exchanger cell and are connected to a removable lid of the respective heat exchanger cell.

9. The device according to claim 1, wherein the distributor device comprises a number of controllable flaps.

10. A device for recovering heat from a liquid medium, comprising:
   a heat exchanger having at least two at least partially thermally separate heat exchanger cells for accommodating the liquid medium, wherein each of the heat exchanger cells comprises a temperature sensor for determining a temperature of the liquid medium situated therein,
   at least one pipeline for carrying one of drinking water and heating water, the at least one pipeline passing through at least one of the heat exchanger cells,
   a supply line, in which the liquid medium is carried,
   a distributor device, by means of which the liquid medium can be selectively supplied to the heat exchanger cells from the supply line,
   at least one temperature sensor for measuring a temperature of the liquid medium in the supply line,
   wherein the distributor device is controllable in at least one of an open loop and a closed loop manner such that the liquid medium from the supply line is supplied to the heat exchanger cell whose current temperature is the least colder than that of the liquid medium in the supply line;
      wherein each of the heat exchanger cells is connected to at least one adjacent one of the heat exchanger cells via at least one of a cell connector and a structure restraining the flow of the liquid medium in each case in order to supply the liquid medium to the at least one adjacent one of the heat exchanger cells; and
      wherein the cell connector respectively comprises at least one of a further controllable flap and a siphon, collecting the liquid medium at an outlet, in particular, at a bottom of a respective upper one of interconnected heat exchanger cells, then conducts the liquid medium at least up to the height of an upper edge of the respective upper one of the interconnected heat exchanger cells and finally into a respective lower one of the interconnected heat exchanger cells.

11. The device according to claim 10, wherein a vent valve is provided at a high point of the siphon.

12. The device according to claim 10, wherein the siphon is nm up to the height of a top edge of the top one of the heat exchanger cells.

13. A device for recovering heat from a liquid medium, comprising:
   a heat exchanger having at least two at least partially thermally separate heat exchanger cells for accommodating the liquid medium, wherein each of the heat exchanger cells comprises a temperature sensor for determining a temperature of the liquid medium situated therein,
   at least one pipeline for carrying one of drinking water and heating water, the at least one pipeline passing through at least one of the heat exchanger cells,
   a supply line, in which the liquid medium is carried,
   a distributor device, by means of which the liquid medium can be selectively supplied to the heat exchanger cells from the supply line,
   at least one temperature sensor for measuring a temperature of the liquid medium in the supply line,
   wherein the distributor device is controllable in at least one of an open loop and a closed loop manner such that the liquid medium from the supply line is supplied to the heat exchanger cell whose current temperature is the least colder than that of the liquid medium in the supply line;
      wherein a further pipeline is provided as a return of a heating system, passing through the heat exchanger cells from a bottom upward, wherein between the heat exchanger cells and above a top heat exchanger cell, the pipeline is respectively connected via connection tubes to a feed line, wherein controllable flaps are provided in the connection tubes by means of which a predetermined supply temperature is adjustable in the feed line.

14. A method for operating a device for recovering heat from a liquid medium, the device comprising:
   a heat exchanger having at least two at least partially thermally separate heat exchanger cells for accommodating the liquid medium, wherein each of the heat exchanger cells comprises a temperature sensor for determining a temperature of the liquid medium situated therein,
   at least one pipeline for carrying one of drinking water and heating water, the at least one pipeline passing through at least one of the heat exchanger cells,
   a supply line, in which the liquid medium is carried,
   a distributor device, by means of which the liquid medium can be selectively supplied to the heat exchanger cells from the supply line,
   at least one temperature sensor for measuring a temperature of the liquid medium in the supply line,
   the method comprising controlling the distributor device in at least one of an open loop and a closed loop manner such that the liquid medium from the supply line is supplied to the heat exchanger cell whose current temperature is the least colder than that of a gray-water in the supply line;
      wherein the heat exchanger cells are arranged on top of one another, wherein the coldest liquid medium is stored in a bottom heat exchanger cell and the hottest liquid medium is stored in the topmost heat exchanger cell; and wherein each of the heat exchanger cells is connected to at least one adjacent one of the heat exchanger cells via a cell connector within each case a further controllable flap in order to supply the liquid medium to the at least one of the adjacent heat exchanger cells, wherein, if a heat exchanger cell to be filled is already filled with liquid medium, the further flap thereof in the cell connector is initially opened to provide the necessary space and to conduct the existing liquid medium into one of the subjacent heat exchanger cell and a sewage system.

15. The method as claimed in claim 14, wherein gray water is used as the liquid medium.

16. The method as claimed in claim 14, wherein the one of drinking water and heating water is conducted through the pipeline from a bottom upward through the heat exchanger.

17. A device for recovering heat from a liquid medium, comprising:
   a heat exchanger having at least two at least partially thermally separate heat exchanger cells for accommodating the liquid medium, wherein each of the heat exchanger cells comprises a temperature sensor for determining a temperature of the liquid medium situated therein,
   at least one pipeline for carrying one of drinking water and heating water, the at least one pipeline passing through at least one of the heat exchanger cells,
   a supply line, in which the liquid medium is carried,
   a distributor device, by means of which the liquid medium can be selectively supplied to the heat exchanger cells from the supply line,
   at least one temperature sensor for measuring a temperature of the liquid medium in the supply line,
   wherein the distributor device is controllable in at least one of an open loop and a closed loop manner such that the liquid medium from the supply line is supplied to the heat exchanger cell whose current temperature is the least colder than that of the liquid medium in the supply line;
   wherein the distributor device comprises:
   an outer tube, at which branches to the individual heat exchanger cells are provided,
   an inner tube arranged within the outer tube and rotatable by means of a drive,
   wherein an outer diameter of the inner tube at least approximately corresponds to an inner diameter of the outer tube, wherein the inner tube comprises a respective aperture to each branch at the same level in the longitudinal direction, which, by rotating the inner tube, can be set to an angular position in which it aligns with the respective branch, such that in each rotational position of the inner tube at most one of the apertures is aligned with the associated branch.

* * * * *